UNITED STATES PATENT OFFICE.

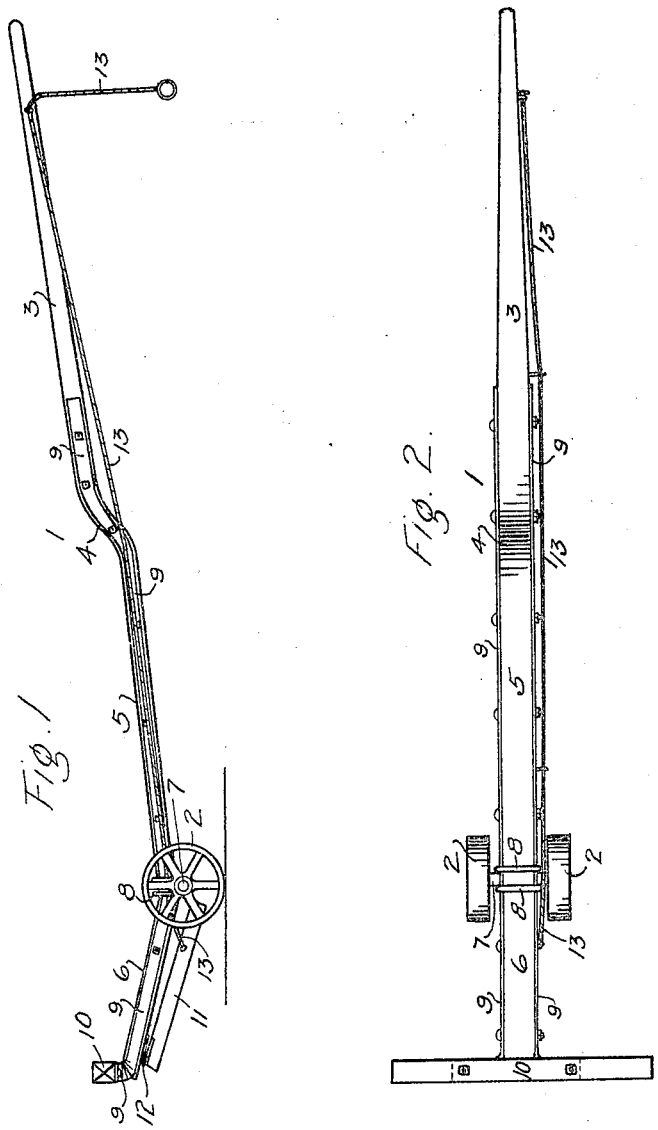

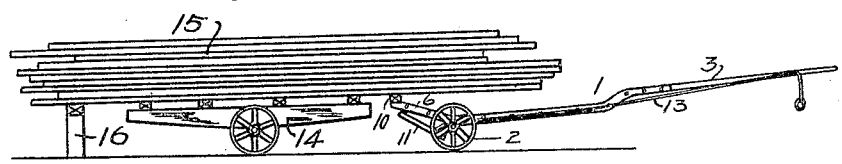
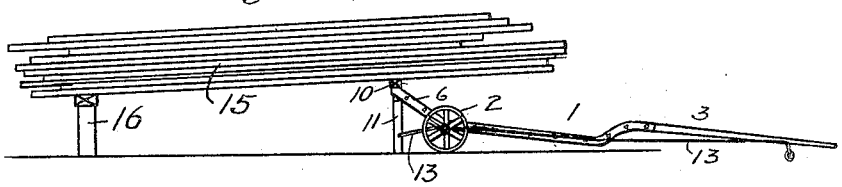
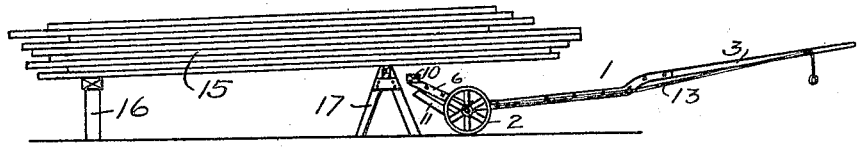

JOHN M. FERRISS, JR., OF TACOMA, WASHINGTON.

LUMBER-UNLOADING MECHANISM.

No. 808,527.  Specification of Letters Patent.  Patented Dec. 26, 1905.

Application filed May 29, 1905. Serial No. 262,798.

*To all whom it may concern:*

Be it known that I, JOHN M. FERRISS, Jr., a citizen of the United States of America, residing at Tacoma, in the county of Pierce and State of Washington, have invented certain new and useful Improvements in Lumber-Unloading Mechanism, of which the following is a specification, reference being had therein to the accompanying drawings.

This invention is an improved lumber-jack or lifting-lever particularly designed for use in expeditiously unloading, loading, and storing lumber in bulk or heavy timbers, beams, &c.; and its objects are to enable a few men to do the work ordinarily required of a large number, and thus greatly reduce the force heretofore required in the transfer of lumber in bulk from the mill to the yard or from the yard to any adjacent locality; also in loading the lumber in bulk from the storage-yards onto cars, and also to lessen the number of transfer-cars heretofore required in such work.

By my invention the lumber can be loaded or unloaded in bulk with great ease and facility from the transfer-cars or trucks left in position for reloading thereon in piles and can be readily reloaded on the trucks or transfer-cars without direct manual handling the several pieces of lumber, as is now required.

The invention will be readily appreciated when compared with the present methods of handling lumber, in which about one thousand feet is ordinarily piled on a transfer-car or truck by hand. Then such truck is pushed to the storage-yard and each piece of lumber has to be unloaded and piled by two men, and when the lumber is to be taken from the storage-yard again each piece of lumber has to be replaced on the truck by two men, whereas by my invention a pile of lumber on a transfer-car can be removed in bulk and replaced in bulk and three men working with my jack can load and unload as much lumber as thirty men under the old method. In addition to this reduction of labor the transfer-cars are not kept idle during long periods of loading and unloading, so that with my invention a few cars can do the work of a large number under the old system.

I will now describe my invention more fully in connection with the accompanying drawings, which illustrate a practical embodiment thereof, and the features constituting the invention and for which protection is desired are summarized in the claims.

In said drawings, Figure 1 is a side view of my lifting-lever, and Fig. 2 is a plan thereof. Fig. 3 shows a transfer-car with a load of lumber having been brought to the storage-ground and the lifting-lever being applied to the end of the load. Fig. 4 is a similar view in which the load has been lifted from the transfer-car and it has been removed from thereunder, and Fig. 5 is a similar view in which the high horse has been inserted to support the end of the load and the lever is being removed.

The jack comprises a powerful lever of peculiar construction having its fulcrum preferably supported on wheels and provided with an adjustable leg or support by which the load can be sustained when pressure is removed from the long end of the lever. As shown, the lever comprises a lifting end section 6, a middle power-transmitting section 5, and a power or handle section 3. The fulcrum of the lever is preferably at the junction of the sections 5 and 6 and, as shown, consists of a squared axle 7, attached to the lever by clips 8 or other suitable fastenings, said axle being provided with wheels 2, so that the jack can be easily moved about. The sections 3 5 6 of the lever are preferably arranged in the same vertical plane, but section 6 is tilted or inclined upwardly at an angle of approximately thirty degrees to section 5, and section 3 is shown as set at a slight angle to section 5 and also above the plane of section 5, the sections 3 and 5 being united by a bend 4. The object of having this transmitting-section 5, which is preferably longer than the lifting-section, located substantially as shown with reference to the section 6 is to enable the lifting-section 6 to be inserted under long low overhanging bodies before the power-section will have to be lowered so much that the jack cannot be effectively used, and, as indicated in Figs. 3 and 4, by having the power-section inclined or elevated upwardly relatively to the transmitting-section the lifting-section can be elevated much farther before the outer end of the power-section strikes the ground than it could be if the power-section were in axial alinement with the transmitting-section. The power-section 3 is preferably rounded, so that the operators can grip it firmly.

The sections 3 5 6 may be strengthened and bonded together by means of side straps or bars 9 of metal bolted thereto at suitable points. These bars 9 preferably extend beyond the end of the lifting-section 6 and are bent outwardly to support a cross bar or head 10 and connect the same rigidly to the lifting-section, thus giving the lifting-section a T form when viewed from above and enabling a wide load of lumber to be lifted and supported at one operation.

The jack is preferably provided with an adjustable load-supporting leg 11, which is hinged at one end to the lifting-section, near the outer end thereof, as shown at 12, and is of such length that when the section 3 is sufficiently depressed, as indicated in Fig. 4, the leg 11 will assume a vertical position by gravity, and when pressure is removed from the handle the leg 11 will sustain the load and retain the jack in lifting position. The leg 11, furthermore, enables a load to be gradually lifted by repeated downward pushes on the power-section, as it will act like a pawl, and gradually assume an upright position if the man or men are unable by a single downward effort or thrust on the power-section to wholly depress it, and by reason of this leg acting as described one man can raise as much with a jack having such a leg as two or three men could without it. The leg may be controlled by a pull cord or chain 13, attached to it and extending forward along the lever. When it is desired to remove the jack, the handle is depressed so as to relieve the leg 11 from pressure, and then the cord is pulled so as to close the leg under the lifting-section, as in Fig. 1, in which position the leg is retained until it is desired to use it again and the cord is released.

Operation: Figs. 3, 4, and 5 illustrate the mode of using the jack in handling lumber. A load of lumber 15, Fig. 3, after being piled on the truck or transfer-car 14 is moved to the desired position, so that one end of the load overlies a low support 16. Then the jack is brought up and the lifting-section 6 run in under the opposite end of the load to the position shown in Fig. 3. Then the power end 3 of the lever is depressed, so that the lifting-section raises the load off the truck 14, upholding the pile of lumber on cross-head 10, as in Fig. 4, and the cord 13 is released, allowing the leg 11 to swing under the cross-head and sustain the load, so that the workmen can let go the lever and remove the truck. A portable "horse" 17 may then be placed under the load near the cross-head, and then the workmen after depressing the power-section sufficiently to relieve leg 11 pulls cord 13, so as to draw the leg against the lifting-section, and removes the jack to use elsewhere. The truck is also ready for service as soon as the load is lifted therefrom. In reloading the trucks the proceedings are reversed. First a truck would be placed under the load while in the position shown in Fig. 5. Then the jack would be run under the load next the horse 17, then the horse would be removed and the load lowered on the truck, and then the jack removed. All these operations can be performed rapidly and easily by two or three men, who can load or unload a number of piles of lumber in the time ordinarily required to handle one load by piecemeal, and if the lumber is properly piled at the outset on the trucks it is not disturbed thereafter.

While the invention is particularly adapted for handling piles of small lumber, it is also equally useful in handling large timbers, beams, and other material and is not restricted to the particular use set forth above.

Having thus described my invention, what I claim as new, and desire to secure by Letters Patent, is—

1. In a lifting-jack, the combination of a lever having a lifting-section, a transmitting-section, and a handle or power section, the lifting and handle sections being upwardly inclined relatively to the transmitting-section; with a wheeled fulcrum attached to the lever adjacent the junction of the lifting and transmitting sections, substantially as described.

2. In a lumber-lifting jack, a lever having a lifting-section, a transmitting-section, and a handle or power section, the lifting-section being upwardly inclined relatively to the transmitting-section, and the handle-section being located above the plane of the transmitting-section; and a wheeled fulcrum for the lever adjacent the junction of the lifting and transmitting sections, substantially as described.

3. In a lumber-lifting jack, the combination of a lever having a lifting-section at one end, a power-section or handle at the opposite end, and a transmitting-section intermediate and connecting the power and lifting sections; with reinforcing-bars on opposite sides of said sections and bonding them together, and a wheeled fulcrum attached to said lever at the junction of the lifting and transmitting sections, substantially as described.

4. A lumber-lifting lever provided with wheels having a transmitting or central section, a lifting-section attached to one end of said transmitting-section and extending upwardly at an obtuse angle thereto; and a power or handle section attached to the other end of said central section and extending upwardly at an obtuse angle thereto; and a cross-head attached to the free end of the lifting-section.

5. In a lumber-lifting jack, the combination of a lever having a transmitting or central section, a lifting-section attached to one end of said transmitting-section and extending upwardly at an obtuse angle thereto; and a power or handle section attached to the other end of said central section and extending upwardly at an obtuse angle thereto; with a cross-head attached to the free end of the lifting-section, and a fulcrum and support for the lever attached thereto adjacent the junction of the lifting and transmitting sections.

6. The herein-described lumber-lifting jack, comprising a lever having a lifting-section at one end, a central transmitting-section at an obtuse angle to the lifting-section, and a power section or handle at an obtuse angle to the transmitting-section; with a wheeled fulcrum for said lever, substantially as described.

7. The herein-described lumber-lifting jack, comprising a lever having a central transmitting-section, a lifting-section at one end at an obtuse angle to the transmitting-section, and a power section or handle at the other end located in a plane above the transmitting-section but connected therewith by a bend; with a wheeled fulcrum for said lever, substantially as described.

8. The herein-described lumber-lifting jack, comprising a lever having a central transmitting-section, a lifting-section at one end at an obtuse angle to the transmitting-section, and a power section or handle at the other end located in a plane above the transmitting-section but connected therewith by a bend; and a leg hinged to said lifting-section.

9. In combination, a lever having a lifting-section at one end, a power section or handle at the opposite end, and a transmitting-section intermediate and connecting the power and lifting sections; with reinforcing-bars on opposite sides of said sections and bonding them together, substantially as described.

10. The herein-described lumber-lifting jack, comprising a lever having a lifting-section at one end, a central transmitting-section at an obtuse angle to the lifting-section, and a power section or handle at an obtuse angle to the transmitting-section; with metal bars attached to each side of said lever and extending from the handle to the end of the lifting-section.

11. The herein-described lumber-lifting jack, comprising a lever having a lifting-section at one end, a central transmitting-section at an obtuse angle to the lifting-section, and a power section or handle at an obtuse angle to the transmitting-section; with metal bars attached to each side of said lever and extending from the handle to the end of the lifting-section, and a wheeled fulcrum attached to said lever adjacent the junction of the lifting and transmitting sections, substantially as described.

12. The herein-described lumber-lifting jack, comprising a lever having a central transmitting-section, a lifting-section at one end at an obtuse angle to the transmitting-section, and a power section or handle at the other end located in a plane above the transmitting-section but connected therewith by a bend; with metal bars attached to each side of said lever and extending from the handle portion to the lifting portion and beyond the end of the lifting-section, and a cross-head attached to the projecting ends of said bars.

13. The herein-described lumber-lifting jack, comprising a lever having a central transmitting-section, a lifting-section at one end at an obtuse angle to the transmitting-section, and a power section or handle at the other end located in a plane above the transmitting-section but connected therewith by a bend; with metal bars attached to each side of said lever and extending from the handle portion to the lifting portion and beyond the end of the lifting-section, a cross-head attached to the projecting ends of said bars; and a wheeled fulcrum attached to said lever adjacent the junction of the lifting and transmitting sections, substantially as described.

14. In a device for unloading lumber, the combination of a low support over which the lumber is placed, a lever adapted to raise the other end of the lumber, and means for sustaining said lumber in said raised position.

15. In a device for unloading lumber, the combination of a low support over which the lumber is placed, a wheeled lever adapted to raise the other end of the lumber, and removable means for sustaining said lumber in said raised position.

16. In a lifting-jack, the combination of a lever having a lifting-section projecting beyond its fulcrum, a transmitting-section, and a power-section, the transmitting-section being intermediate the power and lifting sections, said lifting-section being inclined at an angle to the transmitting-section; with a supporting-leg hinged to the lifting-section and a wheeled fulcrum for the lever adjacent the junction of the lifting and transmitting sections, substantially as described.

17. In a lifting-jack, the combination of a lever having a lifting-section, a transmitting-section, and a handle or power section, the lifting and handle sections being upwardly inclined relatively to the transmitting-section; with a supporting-leg hinged to the lifting-section and means for closing the leg, substantially as described.

18. A lumber-lifting lever having a transmitting or central section, a lifting-section attached to one end of said transmitting-section and extending upwardly at an obtuse angle thereto; and a power or handle section attached to the other end of said central section and extending upwardly at an obtuse angle thereto; a supporting-leg hinged to the lifting-section, and a cross-head attached to the free end of the lifting-section.

19. In a lumber-lifting jack, the combination of a lever having a transmitting or central section, a lifting-section attached to one end of said transmitting-section and extending upwardly at an obtuse angle thereto; and a power or handle section attached to the other end of said central section and extending upwardly at an obtuse angle thereto; with a supporting-leg hinged to the lifting-section, and a fulcrum and support for the lever attached thereto adjacent the junction of the lifting and transmitting sections.

In testimony whereof I affix my signature in presence of two witnesses.

JOHN M. FERRISS, Jr.

Witnesses:
WM. S. SHANK,
M. A. VAN HOUSE.